United States Patent
Subramanya Iyer Srinivas Iyer et al.

(10) Patent No.: US 10,372,557 B2
(45) Date of Patent: Aug. 6, 2019

(54) VERSIONING AND RECOVERY OF WORKLOADS

(71) Applicant: Hewlett Packard Enterprise Development LP, Houston, TX (US)

(72) Inventors: Harish Subramanya Iyer Srinivas Iyer, Bangalore (IN); Bharat Misra, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 276 days.

(21) Appl. No.: 15/451,868

(22) Filed: Mar. 7, 2017

(65) Prior Publication Data

US 2017/0322852 A1    Nov. 9, 2017

(30) Foreign Application Priority Data

May 3, 2016    (IN) .............................. 201641015419

(51) Int. Cl.
| G06F 11/00 | (2006.01) |
| G06F 11/14 | (2006.01) |
| G06F 9/4401 | (2018.01) |
| G06F 8/71 | (2018.01) |

(52) U.S. Cl.
CPC ............ *G06F 11/1469* (2013.01); *G06F 8/71* (2013.01); *G06F 9/441* (2013.01); *G06F 11/1417* (2013.01); *G06F 11/1451* (2013.01); *G06F 2201/805* (2013.01)

(58) Field of Classification Search
CPC ........ G06F 8/71; G06F 9/441; G06F 11/1417; G06F 11/1451
See application file for complete search history.

(56) References Cited

U.S. PATENT DOCUMENTS

| 6,535,998 | B1 | 3/2003 | Cabrera |
| 8,769,055 | B2 | 7/2014 | Murphy |
| 9,218,377 | B2 | 12/2015 | Chen |
| 2009/0222498 | A1 | 9/2009 | Lu |
| 2009/0319580 | A1* | 12/2009 | Lorenz .................... G06F 8/71 |

(Continued)

OTHER PUBLICATIONS

"Rackware Brings Cloud-based Disaster Recovery for Physical and Virtual Workloads," Jul. 29, 2014, 5 Pgs., <http/www.rackwareinc.com/rackware-brings-cloud-based-disaster-recovery-physical-virtual-workloads/#sthash.DcTErBe5.bJN7PcX7.dpbs >.

(Continued)

*Primary Examiner* — Jason B Bryan
(74) *Attorney, Agent, or Firm* — Brooks, Cameron & Huebsch, PLLC (57) ABSTRACT

In one example, a method may include generating, by a computing device, a volume as a file in memory, where the volume may be based on an operating system (OS) image. The method may include attaching the file to a workload, booting the workload using the OS image, generating a version of the file with at least one block that underwent change and metadata associated with the change based on an input/output request to the volume, storing, by the computing device, the file and the version of the file on a storage device associated with the computing device, and recovering a version of the volume associated with the workload using the file and the version of the file stored in the storage device.

13 Claims, 10 Drawing Sheets

(56) References Cited

U.S. PATENT DOCUMENTS

2010/0114825 A1* 5/2010 Siddegowda ............. G06F 8/71
707/638
2010/0228913 A1* 9/2010 Czezatke ............ G06F 11/1451
711/112

OTHER PUBLICATIONS

System Recovery the gold standard in disaster recovery, Oct. 6, 2015, 4 Pgs., <https://www.veritas.com/product/backup-and-recovery/system-recovery.html >.

* cited by examiner

| TYPE= BIT TABLE | BIT TABLE LENGTH | BIT TABLE | TYPE= BLOCK ADDRESS | LENGTH OF BLOCK ADDRESS | BLOCK ADDRESS | TYPE= BLOCK DATA | BLOCK DATA LENGTH | BLOCK DATA |
|---|---|---|---|---|---|---|---|---|
| 1 | 2097152 | 101010101 010101010 101010101 | 2 | 8 | 0xACBDEF | 3 | 454 | BLOCK DATA LENGTH |

VERSIONING AND RECOVERY OF WORKLOADS

BACKGROUND

A computing device may execute an operating system (OS). An OS may manage utilization of resources of the computing device. The computing device may be patched with firmware, OS and/or application updates which may sometimes lead to OS failure.

BRIEF DESCRIPTION OF THE DRAWINGS

Certain examples are described in the following detailed description and in reference to the drawings, in which.

DETAILED DESCRIPTION

Operating system copies are distributed on a media e.g. floppy disk, compact disc read-only-memory (CD-ROM), digital video disc (DVD), or universal serial bus (USB) storage device. A computing device (i.e., also referred to as server) may provision itself i.e., install and configure an operating system (OS) using these media. Provisioning of a computing device using these media may be very time-consuming. As an example, setting up an operating environment and provisioning the computing device may take about 30-50 minutes. Sometimes, the computing device may get patched with firmware, OS and/or application updates which may lead to OS failure. In such cases, a workload running on the computing device can be recovered from a recent backup taken for the computing device and may manually redo the configurations, patches and/or management changes that may be done after a last backup. This process may take significant time (e.g., couple of hours to several days) depending on the time difference between the last backup to time of failure. In such cases, the load shared by the computing device may not be available and may lead to overload on other computing devices or indirect monetary loss.

Examples described herein may provide techniques for generating a volume as a file in memory, where the volume is based on an OS image (e.g., base image) and the file may be attached to a workload. The workload may be booted using the OS image. Examples described herein may generate versions of the file with only blocks that underwent changes and metadata associated with the changes based on input/output (IO) requests to the volume. The metadata may include linear address of the block that underwent change and information related to IO operation, such as percentage of dirtiness, write length, and/or character set. A version of the file may be generated (e.g., each time) when the volume undergoes a change.

Examples described herein may provide techniques for versioning of a computing device, which includes storing the file and the versions of the file on a version store in a storage device based on unique identifiers associated with the computing device. For example, the versioning of the computing device may be triggered based on predefined intervals, percentage of dirtiness on the file, when directories undergo changes, when an IO is performed on the volume, or some combination thereof.

Also, examples describe techniques for recovering/forming a version of the volume associated with the workload on a target device based on the file and the versions of the file that are stored in the storage device. In one example, the version of the volume associated with the workload is recovered by identifying blocks to be combined in the storage device by applying a bloom filter and recovering the version of the volume associated with the workload using the identified blocks.

Examples described herein may be based on versioning of the blocks when the block undergo changes, instead of file level changes. Examples described herein may eliminate a need for an initial complete OS backup. Examples described herein may provide versioning as a part of system management appliance, and the restore operation can be triggered via simple graphical user interface (GUI) with one click. Examples described herein can recover the workload to the point of failure on a same hardware or on a different hardware within significantly less time (e.g., same hardware takes about 10 seconds, and different hardware takes about 2 minutes). Examples described herein may also be used as a cookie cutter for any workload using the recovery on different hardware feature and useful when administrators may want to clone a particular stable configuration to other machines.

Examples described herein may be secure, cost effective, and may recover any version of a workload up to a last change of OS state. Examples described herein can be extended to any non-volumized deployments by capturing a base image when versioning starts for first time, thereby can be implemented on different environments provided that a version agent is deployed on the OS and an image versioning appliance is reachable by the version agent.

In the following description, the terms "computing device" and "server" are used interchangeably throughout the document. Further, the terms "version file" and "version of a file" are used interchangeably throughout the document. Also, the terms "OS image", "base image" and "base volume" are used interchangeably throughout the document and may refer to a compressed collection of reference files and folders that may be needed to successfully install and configure an operating system on a computing device.

Figure 1:
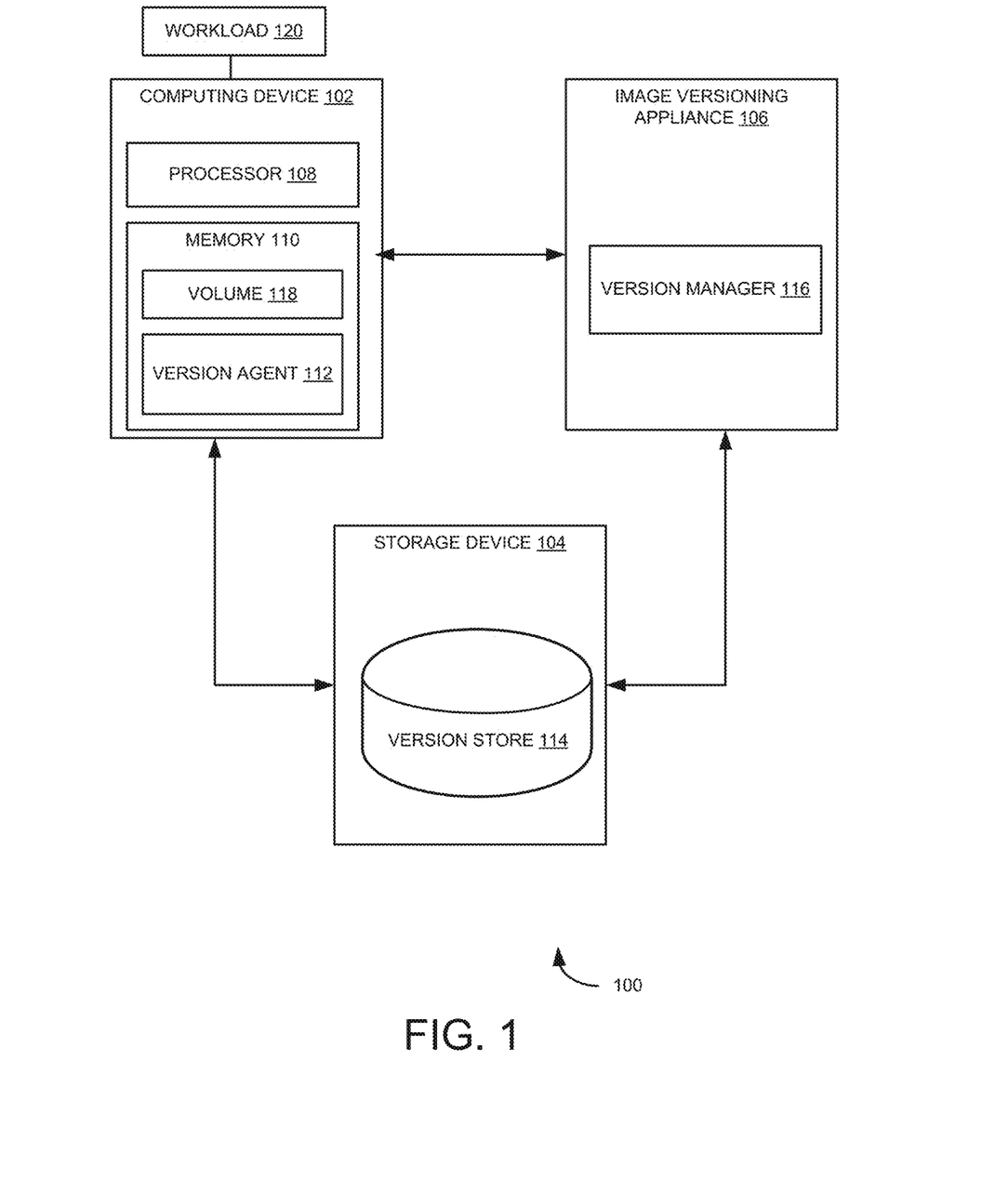
FIG. 1 is a block diagram of an example system for automatic versioning and recovery of volume associated with workloads.

FIG. 1 is a block diagram of an example system 100 for automatic versioning and recovery of workloads. System 100 may include a computing device 102, a storage device 104 coupled to computing device 102, and an image versioning appliance 106 connected to computing device 102 and storage device 104. Computing device 102 may include a processor 108 and memory 110. Memory 110 may include a volatile or non-volatile memory, such as dynamic random access memory (DRAM) or an extremely fast non-volatile memory, such as resistive ram (ReRAM), memristor memory, or the like. Processor 108 may include a central processing unit (CPU), application-specific integrated circuit (ASIC), field programmable gate array (FPGA), or the like, or some combination thereof.

Storage device 104 may include a version store 114. For example, storage device 104 may include a logical or physical storage device, such as a storage area network (SAN), storage array, hard drive, solid state drive, and the like, or some combination thereof. For example, version store 114 is a file repository that may be exposed to image versioning appliance 106 over various protocols. Example protocols may include hypertext transfer protocol (HTTP), HTTP secure (HTTPS), file transfer protocol (FTP), secure FTP (SFTP), server message block (SMB), secure copy protocol (SCP), secure shell (SSH) and the like). On version store 114, multiple bookkeeping services may run to keep the version store collated. Further, a global retention policy for a number of days of versions to keep may be predefined, for instance, by an administrator. Once the limit is reached, the versions can be merged/consolidated to form a consolidated version file that serves as a base volume.

Figure 2:
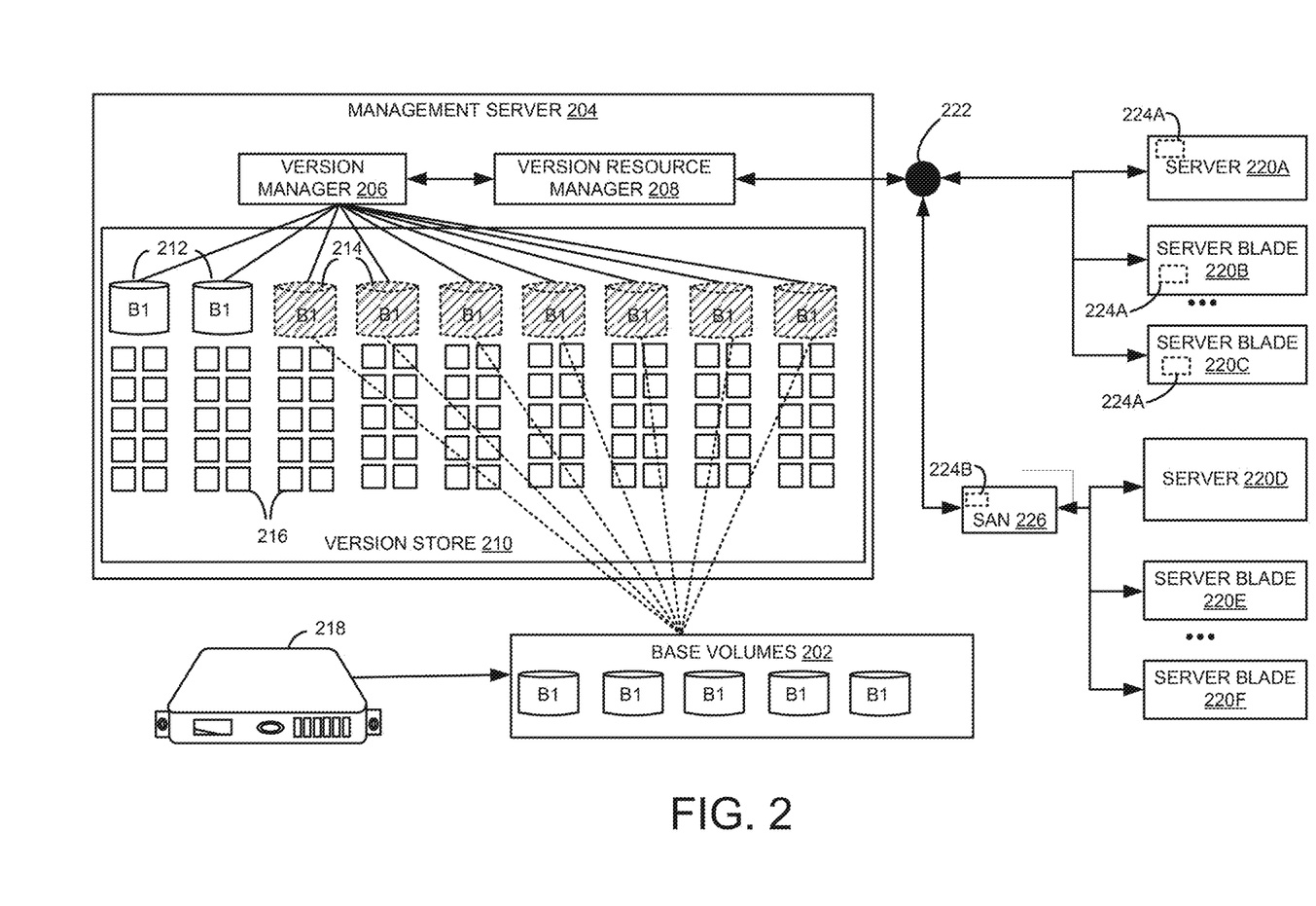
FIG. 2 is an example conceptual diagram depicting a version manager that can be implemented as a part of version resource manager within a management server.

In the example shown in FIG. 1, storage device 104 is shown as an external device connected to image versioning appliance 106, however, storage device 104 can also be implemented as an internal storage of image versioning appliance 106. In another example, image versioning appliance 106 can also be implemented as part of a management server, for example, management server 204 as shown in FIG. 2.

Computing device 102 may have access to OS image. OS image may be an image, such as an ISO (international standards organization) image stored on memory 110 or storage device 104 in some examples. In some examples, the OS image may comprise media such as a CD or DVD that is coupled via a drive with computing device 102.

Computing device 102 and image versioning appliance 106 may perform volumization and recovery in accordance with techniques described herein. To perform volumization, computing device 102 may include a version agent 112. In the example shown in FIG. 1, version agent 112 is shown as residing in computing device 102, however, it can also be implemented as part of storage area network (SAN) fabric and connected to computing device 102 via a network.

Version agent 112 may create volume 118 in memory 110. Version agent 112 may create volume 118 as a memory-mapped file by using system calls in various examples. Version agent 112 may create volume 118 based on OS image (e.g., base image). More particularly, Version agent 112 may create volume 118 by copying files from the OS image into locations within volume 118. The OS image may represent a compressed collection of reference files and folders that may be needed to successfully install and configure an operating system on computing device 102.

As will be described in greater detail, volume 118 may appear as a file in memory 110. Storing volume 118 in memory 110 may allow faster access to volume 118. Periodically, version agent 112 may cause portions of volume 118 to be written to version store 114 in storage device 104.

Processor 108 may execute a workload 120 (e.g., virtual machine (VM)) on computing device 102. Processor 108 may execute workload 120 and construct volume 118 in parallel in various examples. Processor 108 may cause workload 120 to boot based on the OS image. Workload 120 may boot using OS image to determine the version of the OS image. For example, workload 120 may determine that the OS image is a version of Windows, Linux, or a VM host, as some examples. Processor 108 may cause volume 118 to be attached (e.g. mounted as a drive, such as a virtual hard drive or disk drive) on workload 120. In various examples, processor 108 may begin execution of workload 120 before or after attaching volume 118 and/or OS image to workload 120.

Figure 3:
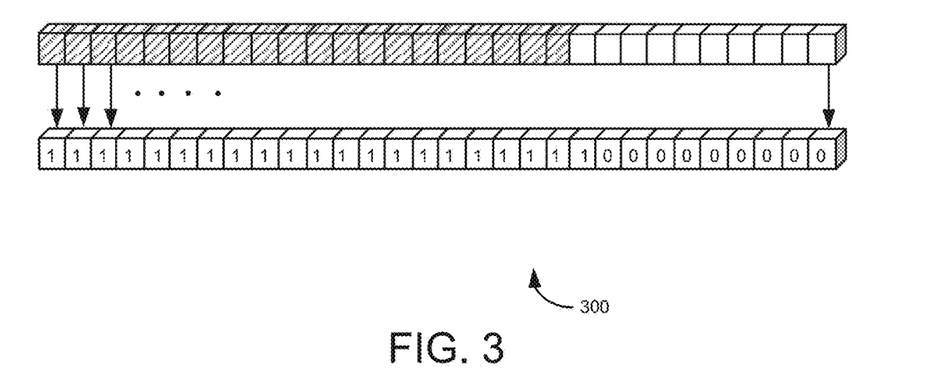
FIGS. 3 and 4 illustrate an example base bit table (BBT) and an example volatile BBT, respectively, used for generating a version of the file.
Figure 4:
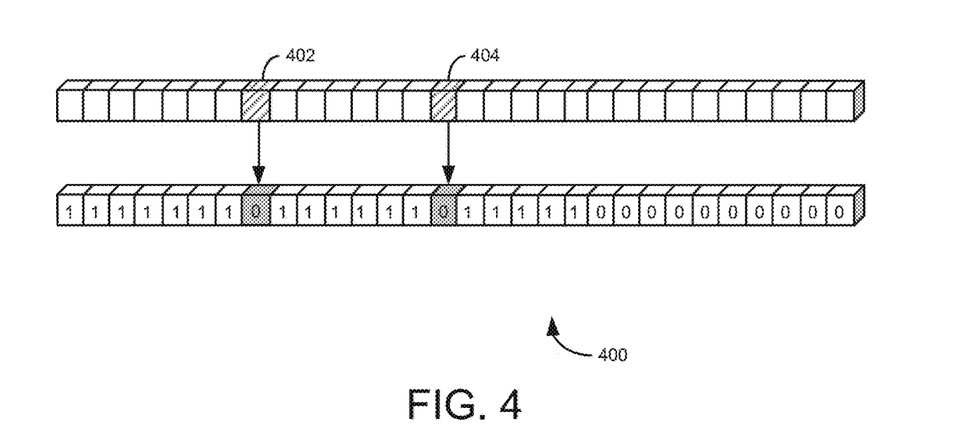

Version agent 112 may generate a version of the file with at least one block that underwent change and metadata associated with the change when an IO request is issued to volume 118. In one example, version agent 112 may provide a base table in memory 110 associated with the workload 120. Example base table may include a base bit table (BBT) as shown in FIG. 3. The base table may preserve a state of the OS/volume 118 to know block structure and IO performed. Further, version agent 112 may provide a copy of the base table in memory 110 associated with workload 120. For example, the copy of the base table may include a volatile BBT as shown in FIG. 4. The copy of the base table may be updated when a block is changed based on an IO request to the volume 118. In another example, the base table and copy of the base table may be provided in a disk associated with the workload 120.

Furthermore, version agent 112 may perform a differential check (e.g., a bit operation) on the base table and the copy of the base table to identify the blocks that underwent changes. Also, version agent 112 may generate the version of the file with the identified blocks that underwent changes and the metadata associated with the changes. For example, a version of the file is generated (e.g., each time) when the volume 118 undergoes a change, and hence may result in multiple versions for the file.

Version agent 112 may store the file and the versions of the file on version store 114, which may be referred as versioning of workload 120. The versioning of the workload 120 on storage device 104 may be triggered based on predefined intervals, percentage of dirtiness on the file, when directories undergo changes, when an IO is performed on volume 118, or some combination thereof.

To perform recovery, image versioning appliance 106 may include a version manager 116. Version manager 116 may recover any version of the volume 118 associated with workload 120 using the file and the version of the file stored in version store 114 of storage device 104. In one example, the file and the version of the file stored in the storage device 104 are used to form/recover the version of the volume associated with the workload 120 on a target device during one of a crash, version rollback and a workload cloning.

Figure 11:
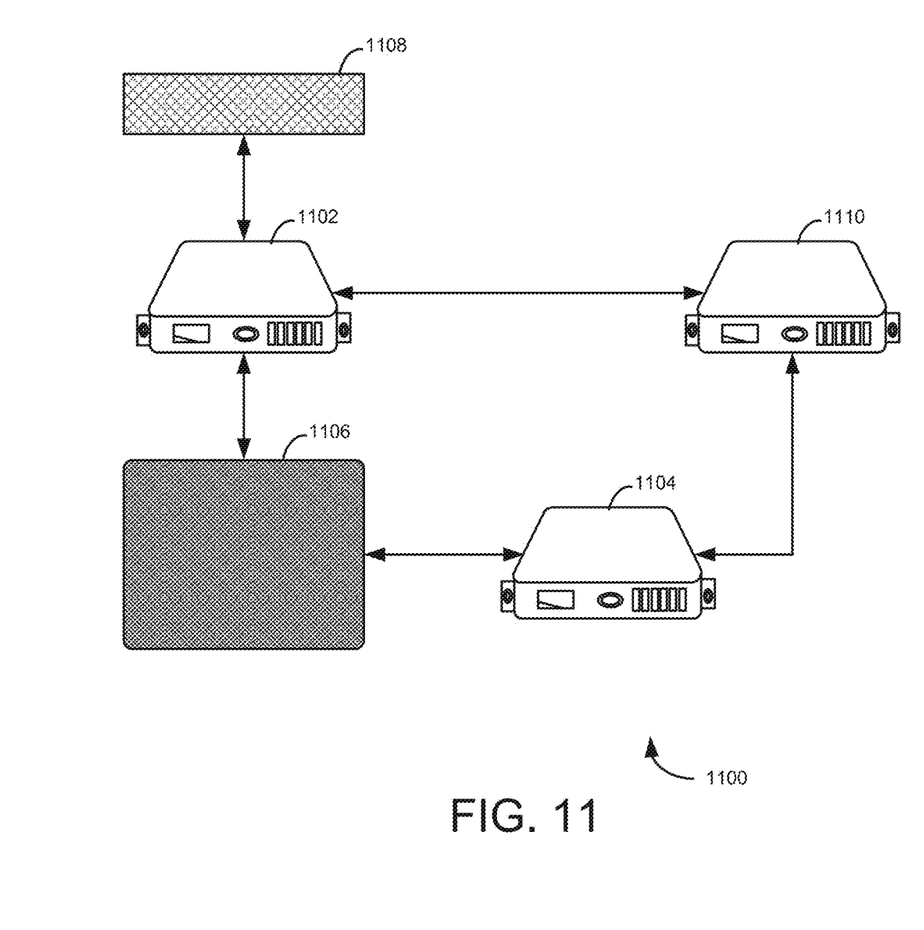
FIG. 11 depicts an example pictorial representation of addition or participation of a server for versioning.

In the example shown in FIG. 1, version manager 116 is shown as part of a separate image versioning appliance 106, however, version manager 116 can also be implemented as a resource manager within a management server (e.g., as shown in FIGS. 2 and 11). In both cases, version manager 116 can have an associated storage device 104 for managing the versions of workload 120.

In one example, version manager 116 may identify blocks to be combined in version store 114 using a bloom filter and the metadata, and then recover the version of the volume 118 associated with the workload 120 on the target device using the identified blocks. In one example, the target device may be the same computing device 102 or a different computing device (e.g., homogeneous or heterogeneous computing device to computing device 102). For example, the bloom filter may be a data structure designed to identify, rapidly and memory-efficiently, blocks in a version store by eliminating false positives. Identifying blocks to be combined in version store 114 using the bloom filter is explained in FIG. 5.

For example, version manager 116 may recover the version of the volume associated with workload 120 by deploying the volume based on the OS image on to a target device, booting the target device using the OS image, identifying blocks associated with workload 120 to be combined in version store 114 using a bloom filter and the metadata, and enabling a version agent associated with the target device to recover the version of the volume associated with workload 120 on the target device by sending the identified blocks to the target device and mapping the identified blocks to the OS image. Recovering the volume on a target device is explained in FIGS. 8-10.

In another example, to allow booting on multiple hardware configurations, workload 120 may build a set of advanced configuration power management interface (ACPI) tables. Workload 120 may construct ACPI tables to cover multiple different hardware or configurations. Particularly, based on OS image and/or for example, unattended installation files, workload 120 may determine hardware devices that may be present in hardware permutations of computing devices to which volume 118 may be deployed.

Then, workload 120 may determine a set of ACPI tables corresponding to every ACPI-compatible hardware device (e.g., processors, chipsets, network controllers and the like) that may be present in the determined hardware permutations. Workload 120 may store the determined set of ACPI tables in volume 118 such that when volume 118 is booted, the OS reads the set of ACPI tables and has the appropriate ACPI-information for each ACPI-compatible device. Hence, the version of the volume associated with workload 120 can be recovered on the different heterogeneous computing devices using the identified blocks and the set of ACPI tables.

In this manner, computing system 100 represents an example computing device 102 that may create volume 118 in memory 110, where volume 112 is based on an OS image. Version agent 112 may attach (e.g. mount as a drive, such as a virtual hard drive or disc drive) OS image to workload 120, and attach volume 118 to workload 120 as a disk of workload 120. Workload may boot using the attached OS image. Version agent 112 may generate a version of the file with at least one block that underwent change and metadata associated with the change based on an IO request to the volume 118 and enable versioning by storing the file and the version of the file on version store 114. Version manager 116 may recover any version of the volume 118 associated with the workload by applying bloom filter on the file and the versions of the file stored in storage device 104.

FIG. 2 is an example conceptual diagram 200 depicting a version manager 206 that can be implemented as a part of a version resource manager 208 within a management server 204. For example, management server 204 may include programs to provision, monitor and control hardware (e.g., servers, desktops, and laptops) and firmware (e.g., operating systems, applications, and patches) across a data center. FIG. 2 depicts management server 204, and servers 220A-F (e.g., computing device 102 of FIG. 1) connected to management server 204 via a network 222. Example computing devices may include servers (e.g., 220A and 220D) or a server blades (e.g., 220B, 220C, 220E and 220F). Each server 220A-F may execute at least one workload (e.g., VM). Further, FIG. 2 depicts base volumes 202 and a media server 218.

Management server 204 may include version store 210. Version store 210 may include base images/OS images 212, references to OS images 214 and trickle versions 216 associated with OS images 212 and 214. In one example, media server 218 may provide base images 212 and 214 in base volumes 202, which may be used for versioning of workloads in version store 210.

In one example, servers 220A-F may be associated with a version agent 224A or 224B (e.g., version agent 112 as shown in FIG. 1). In one example, version agent 224A may reside in the memory of a computing devices (e.g., servers 220A, 22B and 220C). In another example, version agent 224B may reside in a storage area network (SAN) fabric 226 and connected to the computing devices (e.g., servers 220D, 220E and 220F) via a network 222.

Version agent (e.g., 224A or 224B) may perform image versioning of a workload in three parts. First being base image (e.g., 212 or 214) of a workload which may participate in versioning of the workload. Second being incremental changes to a volume associated with the workload, which may be referred to as trickle versions 216. Third being a base bit table which may preserve a state of the base volume (i.e., 212 or 214) and trickle versions 216.

For example, base image (e.g., 212 or 214) may be a reference to the volumized image available on a common image repository. Base images 212 may represent captured base images and base images 214 (as shown in dotted lines) may represent the reference to base images on the common image repository.

In one example, version resource manager 208 may identify a base image 212 used while provisioning a workload on version store 210 by querying a server profile. Further, version resource manager 208 may map identifier associated with base image 212 with a versioning identity in version store 210. The mapping information may be written into an encrypted metadata file, which can be used during version recovery or workload cloning. The mapping information may eliminate the need for performing initial backup, which may save significant amount (e.g., multi gigabytes) of storage.

Further, servers 220A-F deployed in the data center may refer to a single volume that may be generated by the volumization process. In one example, versioning of a workload running on server 220A can be performed after provisioning workload (i.e., before performing any IO request as shown in FIG. 2). In another example, when the volume associated with the workload undergoes changes before enlisting for versioning, a comparative version file may be generated by performing a differential check between base volume associated with the workload on media server 218 and the volume on server 220A. The version file can be stored as a first version of the volume in version store 210.

In yet another example, when a volume of server 220A is not part of the volumized deployment, version agent 224A may halt the IO request for a period of time to capture a state of a file system and associated indices. Using the file system and associated indices, a base image (e.g., 212) may be constructed by pulling the content from the disk and then base image 212 is stored as part of the version history for the workload running on server 220A on version store 210.

In operation, version agents 224A and 224B may perform versioning of the workloads on associated servers 220A-F and version manager 206 may perform recovery of versions of volumes associated with workload in accordance with the examples described in FIG. 1.

For example, consider a workload running on server 220A and version agent 224A is associated with server 220A. Further, base image 212 in version store 210 may correspond to the workload running on the server 220A. In this scenario, version agent 224A may identify changes occurring to a volume associated with the workload by hooking into IO subsystem of server 220A and subscribing for IO metadata. When version agent 224A gets notified on the IO request through metadata, version agent 224A may translate the IO request into block level indices. Since version agent 224A may use the volume as a linear block device, by jumping the address, version agent 224A can pick a block that underwent change without hampering the IO system/kernel/processor.

To identify the changes associated with the volume, version agent 224A may use two base bit tables (BBTs). FIGS. 3 and 4 illustrate an example BBT 300 and an example volatile BBT 400 used for generating version of the file. BBT 300 may be associated with a base volume and volatile BBT 400 may be a clone of BBT 300 that may be updated upon IO to the volume. When a block undergoes a change, version agent 224A may update volatile BBT 400 to track the changes.

FIG. 4 depicts modified blocks 402 and 404 based on the IO to the volume. Further, version agent 224A may identify the blocks to be picked for the versioning by performing a differential operation (e.g., bit operation) on BBT 300 and volatile BBT 400. Furthermore, version agent 224A may generate a version of the file with blocks 402 and 404 that underwent changes and ship the version of the file to version store 210 along with volatile BBT 400. The version of the file may be stored in version store 210 as part of trickle versions 216 corresponding to base image 212. Upon successful write of version of the file to version store 210, BBT 300 on disk associated with workload may be updated with the BBT in memory.

For example, version agent 224A may trigger versioning of server 220A based on predefined intervals (e.g., every 30 minutes), percentage of dirtiness on the file (e.g. 0.5% of entire volume size), when directories (e.g., (e.g. /root, /bin, and /usr) undergo changes, when an IO is performed on the volume, or some combination thereof. During recovery, version manager 206 may recover any version of the volume associated with the workload by applying bloom filter as explained in FIG. 5.

Figure 5:
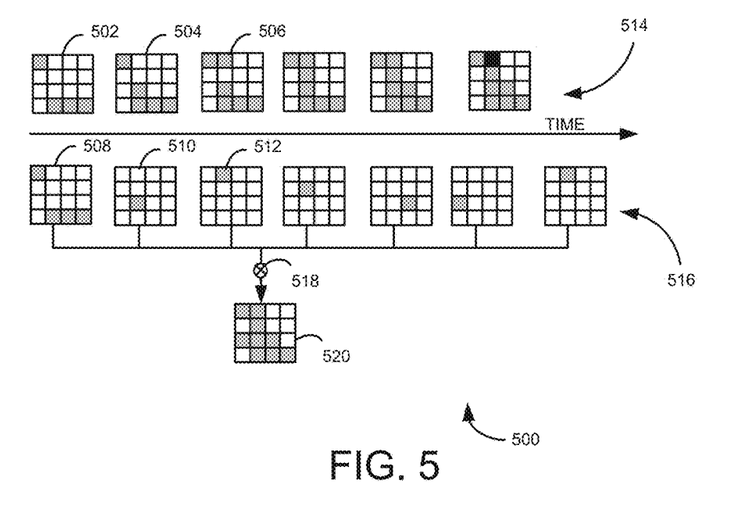
FIG. 5 is an example conceptual diagram illustrating identifying blocks to be combined in the version store using a bloom filter and the metadata.

FIG. 5 is an example conceptual diagram 500 illustrating identifying blocks to be combined in the version store using a bloom filter and the metadata. In the example shown in FIG. 5, a variant of the bloom filter may be used for rapid check on the block IO and version data assembly. Example shown in FIG. 5, may depict how internally, the bloom filter may be used to identify the blocks to be combined, during forming/recovering a volume (e.g., during version rollback or workload cloning).

The state of the OS is preserved through a base table (e.g., 508) on the version store. Each time when the volume undergoes a change, a version of the file is generated with only the blocks that underwent changes along with the metadata which helps in recovery of the volume. FIG. 5 depicts a block progress 514 based on IO performed on the volume and snap progress 516 including the versions of the file with respect to time.

In the example shown in FIG. 5, a version agent may provide a base table 502 to preserve a state of the volume. Further, the version agent may provide a copy of base table 504, which may be updated when a block is changed based on an IO request to the volume. Furthermore, the version agent may perform a differential check on base table 502 and copy of base table 504 to identify the blocks that underwent changes. Then, the version agent may generate a version of the file 510 with only the identified blocks that underwent changes and store the version of file 510 in version store by mapping version of file 510 to a corresponding base image 508 in the version store. Upon successful write of the version of the file to the version store, the version agent may use copy of base table 504 as the base table for generating a subsequent version of the file.

Similarly, the version agent may generate a version of file 512 with only the identified blocks that underwent changes by performing a differential check on base table 504 and a copy of base table 506 (e.g., when a block is changed based on an IO request to the volume) and store version of file 512 in version store by mapping version of file 512 to a corresponding base image 508 in the version store.

During recovery, a bloom filter 518 may be applied to identify the blocks to be merged/combined using the metadata associated with the volume. FIG. 5 also depicts an updated file/merged snap 520 that is generated using the identified blocks. Merged snap 520 may be sent to a target device for recovering the volume associated with the workload.

Figure 6:
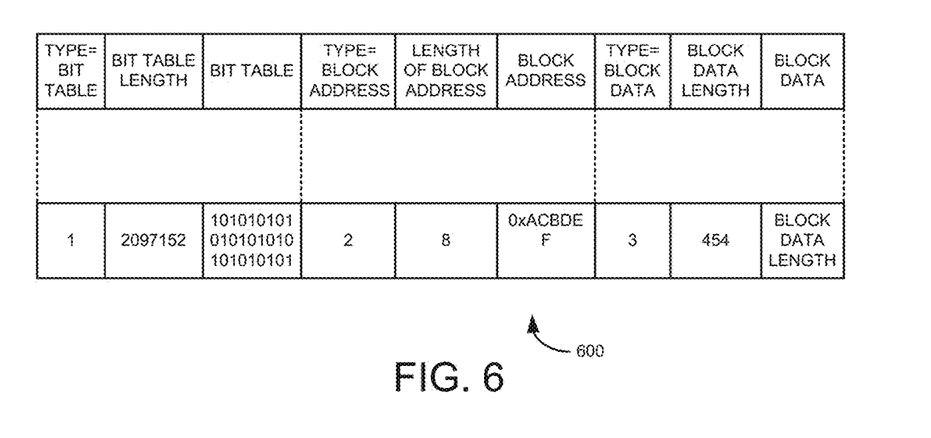
FIG. 6 depicts an example type length value (TLV) representation of a version of a file.
Figure 7:
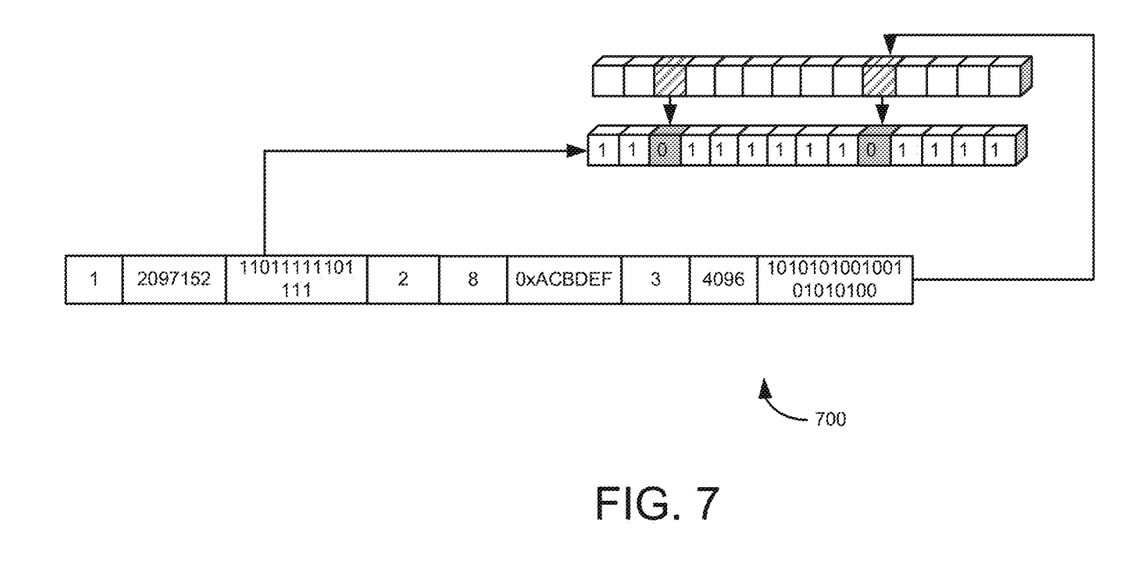
FIG. 7 depicts an example TLV representation of a version of a file and data structure mappings.

FIG. 6 depicts an example type length value (TLV) representation 600 of a version of a file. FIG. 7 depicts an example TLV representation 700 of a version of a file and data structure mappings. The TLV format may be used to assemble the version of the file. Version agent may define three types of content metadata, first being BBT represented by value 1, second being block index (BI) represented by value 2, and third being block data (BD) represented by value 3. The file structure may include data in the order BBT, BI, BD. BBT may be written once in the file, BBT may be preserved to identify the block structure associated with a volume and IO performed on the volume. The BI data may indicate the address of the block that is being written to the file. In a version of the file, BBT may be written once in the beginning, with BI and BD repeating through the file, depending on number of blocks that underwent changes.

To preserve the space, the block data may be passed through multiple compression techniques to accomplish higher density. The compressed data may be written to the version of the file. On the version store, the file is compressed using the same technique and encrypted for increased security. Using these compression techniques, version store may keep low footprint on the storage consumption with increasing versions of the file.

Figure 8:
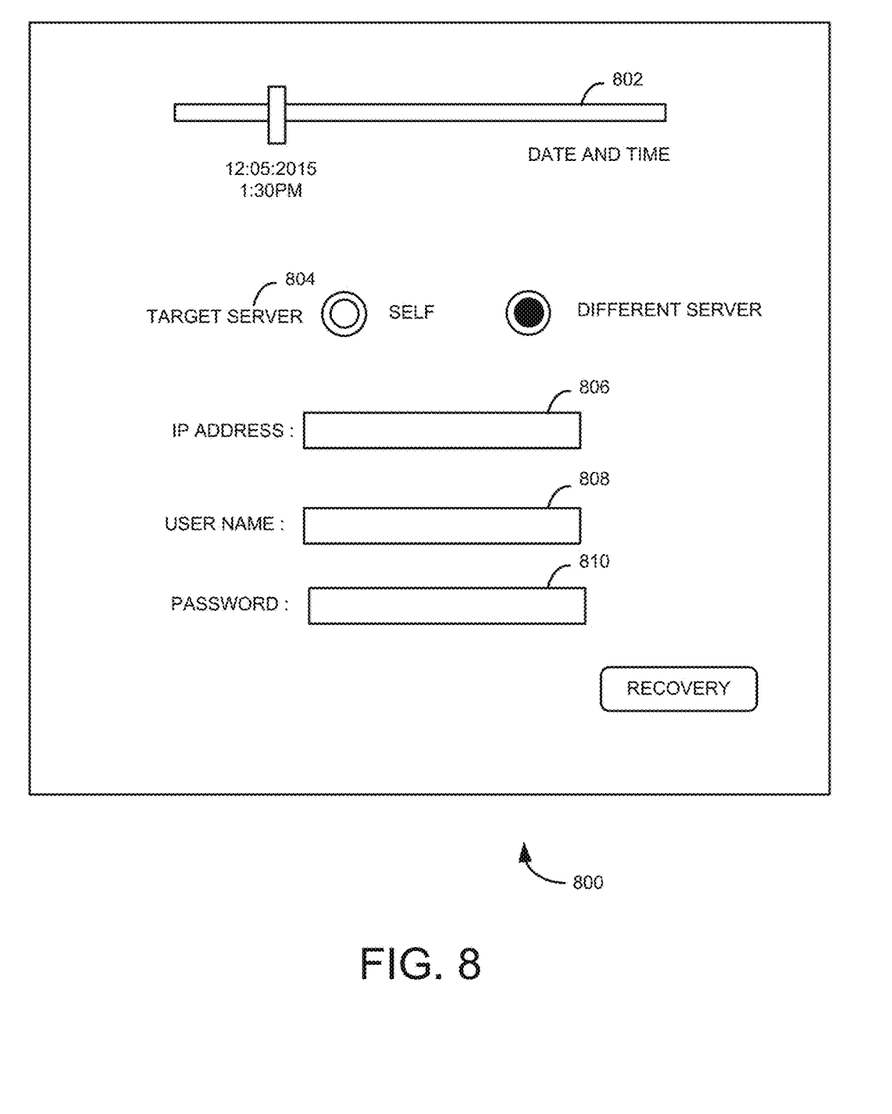
FIG. 8 depicts an example user interface to recover volume associated with the workload.
Figure 9:
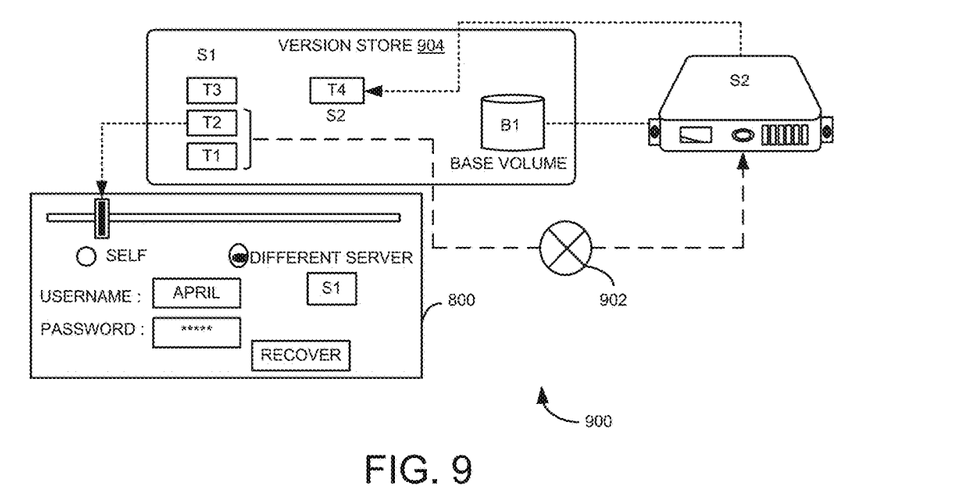
FIG. 9 is an example conceptual diagram depicting recovery of a version of a volume on a different server.
Figure 10:
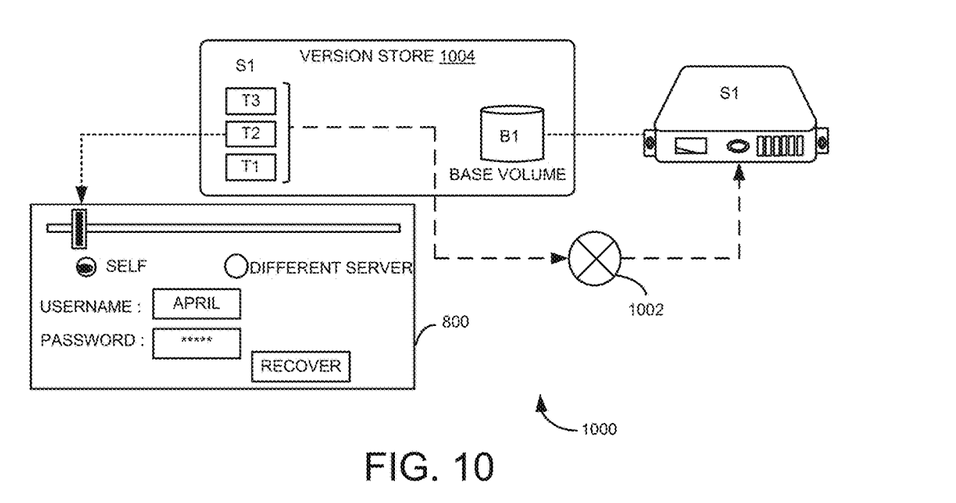
FIG. 10 is an example conceptual diagram depicting recovery of a version of the volume on same server.

FIG. 8 depicts an example user interface 800 for recovering the volume associated with a workload/server. User interface 800 may be displayed on a display device associated with a management server/image versioning appliance. User interface 800 may be used to obtain user input such as a version of a volume associated with a workload to be reverted (e.g., based on date and time) and a target server 804 where the version of the volume to be reverted. Particularly, FIG. 8 depicts a date and time bar 802 which may enable a user/administrator to select date and time to which the state can be reverted. The version of the volume can be recovered on target device 804, which can be same server (e.g., as shown in FIG. 10) or a different server (e.g., as shown in FIG. 9). When recovery of a version of the volume is requested on a different server, then other information, such as Internet protocol (IP) address 806, user name 808, and password 810 associated with the different server, can be provided via user interface 800.

FIG. 9 illustrates an example conceptual diagram 900 for recovering a version of the volume on a different server. When hardware (e.g., server S1 as shown in FIG. 9) on which a workload was running may be in unserviceable condition, the administrator using the graphical user interface 800 can point to a different server (e.g., server S2) to which an image versioning appliance/management server can reach over a network. Using the inputted credentials via graphical user interface 800, server S2 may be booted into service OS and base volume B1 can be deployed directly on to target disk associated with server S2.

Simultaneously, the version manager may prepare a single update file by combining the known versions (e.g., trickle versions T1 and T2) of the volume associated with the workload S1 using the bloom filter and indices on the version store. Once the deployment of base volume B1 is complete, the update file is downloaded from the version store to server S2 and expanded over the base volume B1. For example, recovering the workload on server S2 may be completed within 2 minutes even for the workload volumes of size 1 TB. Further, the version manager may discover hardware details associated with S1 and S2 by comparing the hardware details on the server profile on the management server and, determine whether change in the chipset and peripherals drivers is needed on the volume for recovering on server S2. The version manager may send the updated file along with the drivers (e.g., 902) for recovering the volume on server S2. Further, the version of the volume associated with the recovered workload can be stored (e.g., in T4) in version store 904 corresponding to base volume associated with server S2.

FIG. 10 illustrates an example conceptual diagram 1000 for recovering a version of the volume on same server. In one example, when workload/server S1 may be operating, and administrator may want to just revert to a particular version of the volume (e.g., using graphical user interface 800), the version agent on workload S1 may get the version of the volume from version store 1004 using bloom filter (e.g., by combining trickle versions T1, T2, and T3) 1002 and schedules for a reboot into service OS. When the service OS boot server S1 using base image B1 in version store 1004, the version of the volume may be decrypted and laid on the base image B1 by reading the content from the version of the volume.

In another example, when the workload on server S1 has crashed and server S1 is unbootable, the administrator may choose the appropriate version to rollback to, using the graphical user interface 800. The version manager associated with a management server may detect that server S1 is not in running state and may bring server S1 up and running using a service OS. The version manager may instruct version agent on the service OS to apply the version of the volume to target disk associated with server S1. For example, versioning of workload on same server S1 may take about 5-10 seconds, and the server may be rebooted back to corresponding provisioned OS. Examples described herein may be used for creating clone workloads (i.e., cookie cutter) to deploy latest version of a workload on multiple servers for scaling the servers.

FIG. 11 depicts an example pictorial representation 1100 of addition or participation of a server for versioning. FIG. 11 may include a management server 1102/an image versioning appliance 1104 connected to a version store 1106 and a target server 1110. Image versioning can be implemented on separate image versioning appliance 1104 or can be implemented as resource manager within a management server 1102. In both the cases, a storage (e.g., version store 1106) may be presented for managing the versions of a workload associated with a target server 1110. The administrator may enable a versioning feature available inside server profile 1108 for the workload to which the versioning is applied. When server profile 1108 is applied/re-applied, versioning functionality is enabled on the version agent running on a target server 1110. For servers that do not have the version agent, a version agent can be deployed when server profile 1108 is applied. When a new server is added for versioning, based on a serial number and a universally unique identifier (UUID) of the new server, a mangled name is generated which may uniquely identify the new server and this mapping information may be maintained in the management server 1102. The mangled name may be used for creating the directory structure. Using mangled name, version information may be stored in encrypted and compressed binary format.

Figure 12:
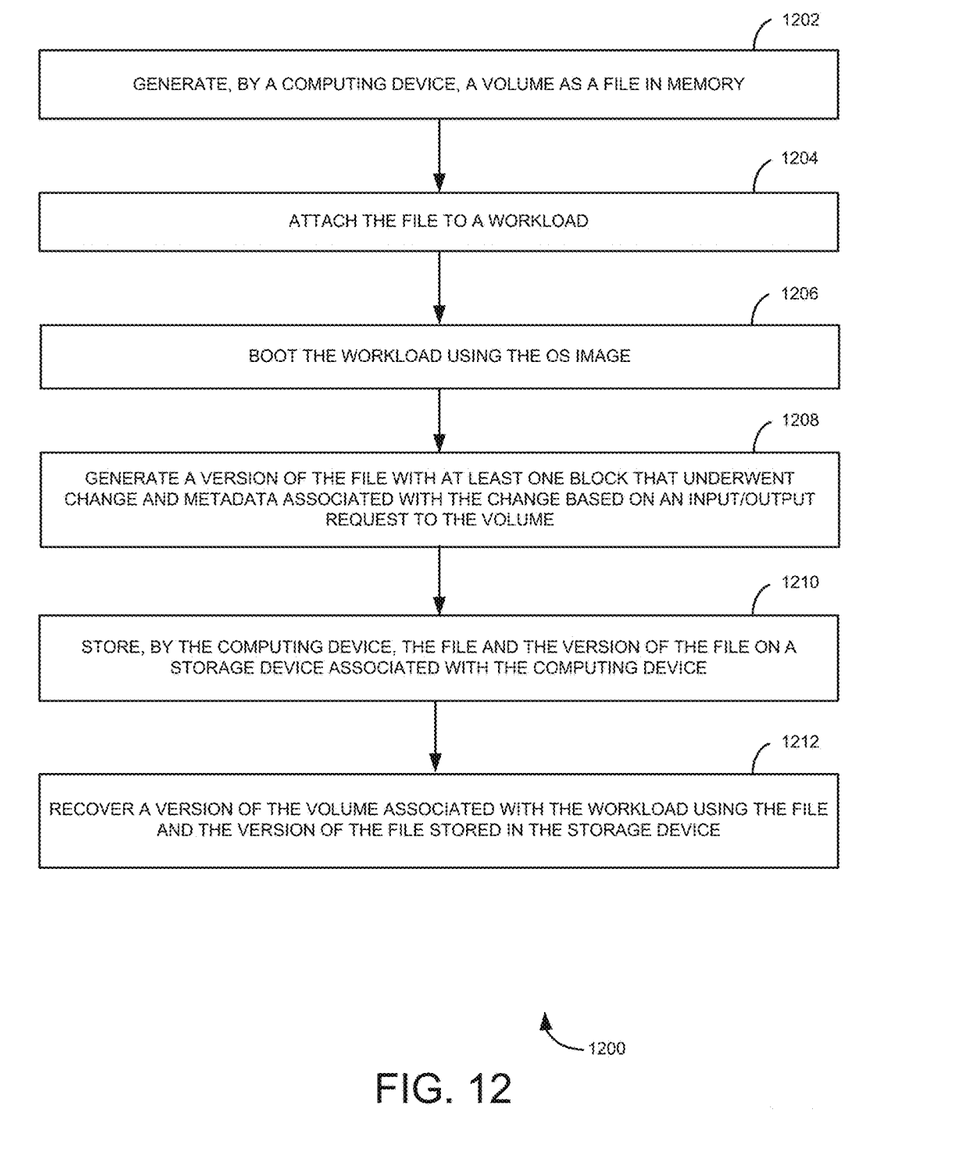
FIG. 12 is a flowchart of an example method for versioning and recovery of workloads.

FIG. 12 is a flowchart of an example method 1200 for versioning and recovery of workloads. Method 1200 may be described below as being executed or performed by a system, for example, system 100 (FIG. 1). In various examples, method 1200 may be performed by hardware, software, firmware, or some combination thereof. Other suitable systems and/or computing devices may be used as well. Method 1200 may be implemented in the form of executable instructions stored on at least one machine-readable storage medium of the system and executed by at least one processor of the system. Alternatively or in addition, method 1200 may be implemented in the form of electronic circuitry (e.g., hardware). In alternate examples of the present disclosure, one or more blocks of method 1200 may be executed substantially concurrently or in a different order than shown in FIG. 12. In alternate examples of the present disclosure, method 1200 may include more or fewer blocks than are shown in FIG. 12. In some examples, one or more of the blocks of method 1200 may, at certain times, be ongoing and/or may repeat.

At 1202, a volume is generated, e.g., by a computing device, as a file in memory, where the volume is generated based on an operating system (OS) image. At 1204, the file is attached to a workload, e.g., running on the computing device. At 1206, the workload is booted using the OS image. At 1208, a version of the file is generated with at least one block that underwent change and metadata associated with the change based on an IO request to the volume. The version of the file may be generated when the volume undergoes a change. Example metadata may include linear address of the block that underwent change and information related to IO operation on the volume, such as percentage of dirtiness, write length, and/or character set.

In one example, a base table may be provided in the memory associated with the workload and the base table may preserve a state of the volume. Further, a copy of the base table is provided in the memory associated with the workload. The copy of the base table may be updated when a block is changed based on an input/output (IO) request to the volume. For example, the base table and the copy of the base table may be provided in a disk associated with the workload. Furthermore, a differential check is performed on the base table and the copy of the base table to identify the blocks that underwent changes. Then, the version of the file is generated with the identified blocks that underwent changes and the metadata associated with the changes.

At 1210, the file and the version of the file are stored, e.g., by the computing device, on a storage device associated with the computing device. In one example, the file and the version of the file may be stored on the storage device associated with the computing device based on predefined intervals, percentage of dirtiness on the file, when directories undergo changes, or when an IO is performed on the volume.

At 1212, a version of the volume associated with the workload may be recovered using the file and the version of the file stored in the storage device. In one example, the version of the volume associated with the workload may be recovered by identifying blocks to be combined in the storage device using a bloom filter and associated metadata, and recovering the version of the volume associated with the workload on the computing device or a different computing device using the identified blocks. The version of the volume associated with the workload may be recovered on the computing device or the different computing device during one of system crash, a version rollback and a workload cloning.

The version of the volume associated with the workload may be recovered on the different computing device by determining, by the workload, a set of advanced configuration power management interface (ACPI) tables for different permutations of hardware, storing, by the workload, the set of ACPI tables in the file, modifying, by the workload, the volume based on the set of ACPI tables such that the modified volume is bootable by any of the different permutations of hardware, and recovering the version of the volume associated with the workload on the different computing device using the identified blocks and the set of ACPI tables.

Figure 13:
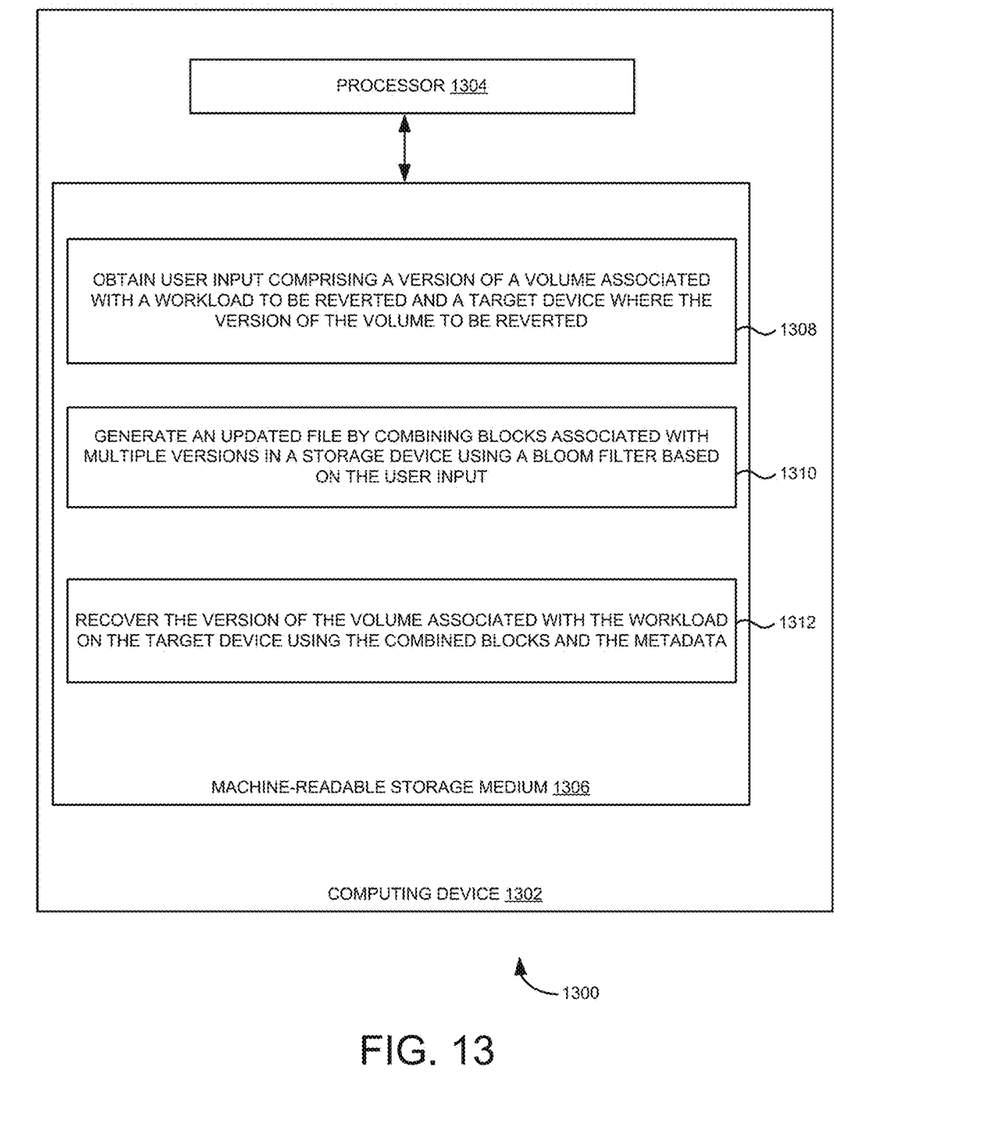
FIG. 13 is a block diagram of an example computing device for recovering a version of a volume on a target server.

FIG. 13 is a block diagram of an example computing device 1302, such as image versioning appliance 106 of FIG. 1 or management server 204 of FIG. 2, for recovering a version of a volume on a target server. In the example of FIG. 13, a computing device 1302 may include a processor 1304 and a machine-readable storage medium 1306. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 1304 may be one or more central processing units (CPUs), microprocessors, and/or other hardware devices suitable for retrieval and execution of instructions stored in machine-readable storage medium 1306. In the particular example shown in FIG. 13, processor 1304 may fetch, decode, and execute instructions 1308-1312 to recover volume associated with workloads on a target device.

As an alternative or in addition to retrieving and executing instructions, processor 1304 may include one or more electronic circuits comprising a number of electronic components for performing the functionality of one or more of the instructions in machine-readable storage medium 1306. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 1306 may be any electronic, magnetic, optical, or other physical storage device that stores executable instructions. Thus, machine-readable storage medium 1306 may be, for example, Random Access Memory (RAM), an Electrically-Erasable Programmable Read-Only Memory (EEPROM), a storage drive, an optical disc, and the like. Machine-readable storage medium 1306 may be disposed within computing device 1302, as shown in FIG. 13. In this situation, the executable instructions may be "installed" on the computing device 1302. Alternatively, machine-readable storage medium 1306 may be a portable, external or remote storage medium, for example, that allows computing device 1302 to download the instructions from the portable/external/remote storage medium.

Referring to FIG. 13, instructions 1308 when executed by processor 1304, may cause processor 1304 to receive/obtain user input comprising a version of a volume associated with a workload to be reverted and a target device where the version of the volume to be reverted, for example, using a graphical user interface 800 of FIG. 8. Instructions 1310 when executed by processor 1304, may cause processor 1304 to generate an updated file by combining blocks associated with multiple versions in a storage device using a bloom filter based on the user input. The target device may be a computing device executing the workload or a different computing device (e.g., homogeneous/heterogeneous computing device).

For example, the storage device may include a version store including a content file and multiple versions of the content file associated with the workload. The content file may preserve a state of a base volume. A version of the content file may include at least one block that underwent changes and metadata associated with changes corresponding to IO to the base volume. Instructions 1312 when executed by processor 1304, may cause processor 1304 to recover the version of the volume associated with the workload on the target device using the combined blocks and the metadata. In one example, non-transitory machine-readable storage medium may include instructions to consolidate base volume associated with multiple workloads in the version store. The file and the version of the file are mapped to a reference of the consolidated base volume in the version store based on a unique identifier associated with the workload.

It may be noted that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

We claim:
1. A system comprising:
a processor;
a memory communicatively coupled to the processor, the memory storing instructions executable by the processor to:
generate a volume as a file in the memory based on an operating system (OS) image;
attach the file to a workload;
boot the workload using the OS image;
generate a version of the file with a block that underwent change and metadata associated with the change based on an input/output request to the volume;
store the file and the version of the file to a version store at a storage device;
identify blocks to be combined in the storage device using a bloom filter and the metadata;
recover a version of the volume associated with the workload on a target device using the identified blocks.
2. The system of claim 1, including instructions to recover the version of the volume by:
deploying the volume based on the OS image on to a target device;
booting the target device using the OS image; and
enabling a version agent associated with the target device to recover the version of the volume associated with the workload on the target device by sending the identified blocks to the target device and mapping the identified blocks to the OS image.
3. The system of claim 1, including instructions to:
provide a base table, wherein the base table is to preserve a state of the volume;
provide a copy of the base table, wherein the copy of the base table is updated when the block is changed based on the input/output request to the volume;
perform a differential check on the base table and the copy of the base table to identify the block that underwent change; and
generate the version of the file with the identified block that underwent change and the metadata associated with the change.
4. The system of claim 1, including instructions to generate the version of the file when the volume undergoes a change, and wherein the metadata comprises a linear address of the block that underwent change and information related to an input/output operation on the volume, and wherein the information related to the input/output operation comprises a percentage of dirtiness, write length, and/or character set.
5. A method, comprising:
generating, by a computing device, a volume as a file in memory, wherein the volume is based on an operating system (OS) image;
attaching the file to a workload;
booting the workload using the OS image;
generating a version of the file with a block that underwent change and metadata associated with the change based on an input/output request to the volume;
storing, by the computing device, the file and the version of the file on a storage device associated with the computing device;
identifying blocks to be combined in the storage device using a bloom filter and associated metadata; and
recovering a version of the volume associated with the workload using the identified blocks.
6. The method of claim 5, wherein recovering the version of the volume associated with the workload on a different computing device comprises:
determining, by the workload, a set of advanced configuration power management interface (ACPI) tables for different permutations of hardware; storing, by the workload, the set of ACPI tables in the file;
modifying, by the workload, the volume based on the set of ACPI tables such that the modified volume is bootable by any of the different permutations of hardware; and recovering the version of the volume associated with the workload on the different computing device using the identified blocks and the set of ACPI tables.
7. The method of claim 5, wherein recovering the volume associated with the workload comprises:
recovering the version of the volume associated with the workload on the computing device or a different computing device during one of system crash, a version rollback and a workload cloning.
8. The method of claim 5, wherein generating the version of the file with the block that underwent the change and metadata associated with the change comprises:
providing a base table in the memory associated with the workload, wherein the base table is to preserve a state of the volume;
providing a copy of the base table in the memory associated with the workload, wherein the copy of the base table is updated when the block is changed based on the input/output request to the volume;
performing a differential check on the base table and the copy of the base table to identify the block that underwent the change; and
generating the version of the file with the identified block that underwent the change and the metadata associated with the change.
9. The method of claim 5, wherein the version of the file is generated when the volume undergoes a change, and wherein the metadata comprises a linear address of the block that underwent change and information related to an input/output operation on the volume, and wherein the information related to the input/output operation comprises a percentage of dirtiness, write length, and/or character set.
10. The method of claim 5, wherein the file and the version of the file are stored on the storage device associated with the computing device based on predefined intervals, percentage of dirtiness on the file, when directories undergo changes, or when an input/output is performed on the volume.
11. A non-transitory machine-readable storage medium having stored thereon machine-readable instructions to cause a computer processor to:
obtain user input comprising a version of a volume associated with a workload to be reverted and a target device where the version of the volume to be reverted;
generate an updated file by combining blocks associated with multiple versions in a storage device using a bloom filter based on the user input, wherein the storage device comprising a version store including a content file and multiple versions of the content file associated with the workload, wherein the content file is to preserve a state of a base volume, and wherein a version of the content file is to include a block that underwent a change and metadata associated with the change corresponding to input/output on the base volume; and recover the version of the volume associated with the workload on the target device using the combined blocks and the metadata.

12. The non-transitory machine-readable storage medium of claim 11, wherein the target device comprises one of a computing device executing the workload or a different computing device.

13. The non-transitory machine-readable storage medium of claim 11, comprising instructions to:
generate a consolidated base volume from the content file and the multiple versions of the content file associated with the multiple workloads in the version store, and wherein the content file and the multiple versions of the content file are mapped to a reference of the consolidated base volume in the version store based on a unique identifier associated with the workload.

* * * * *